United States Patent [19]

Baurand et al.

[11] Patent Number: 5,585,995
[45] Date of Patent: Dec. 17, 1996

[54] ELECTRONIC THERMAL PROTECTION DEVICE

[75] Inventors: Gilles Baurand, Montesson La Borde; Antoine Stentz, Rueil Malmaison, both of France

[73] Assignee: Schneider Electric SA, Boulogne-Billancourt, France

[21] Appl. No.: 370,879

[22] Filed: Jan. 10, 1995

[30] Foreign Application Priority Data

Jan. 10, 1994 [FR] France ................... 94 00240

[51] Int. Cl.$^6$ ........................ H02H 5/04
[52] U.S. Cl. ..................... 361/103; 361/25
[58] Field of Search ................. 361/103, 25, 26, 361/27, 93

[56] References Cited

U.S. PATENT DOCUMENTS 4,054,934  10/1977  Riebs ...................... 361/103
5,283,708   2/1994  Waltz ...................... 361/103

FOREIGN PATENT DOCUMENTS

0477959A2  1/1992  European Pat. Off. .
2439405    5/1980  France .
0214025    3/1987  France .
2641410    7/1990  France .
1563736    8/1966  Germany .
534444     2/1973  Germany .

Primary Examiner—Jeffrey A. Gaffin
Assistant Examiner—Sally C. Medley
Attorney, Agent, or Firm—Oblon, Spivak, McClelland, Maier & Neustadt, P.C.

[57] ABSTRACT

This invention concerns an electronic thermal protection device adapted to interrupt the power supply on a multiphase line comprising a temperature detector including a resistive element thermally coupled to a temperature sensor that is connected to a digital processing circuit adapted to outputt a control order as a function of the overload detected by the temperature sensor. The temperature detector resistive element is connected to various rectifiers, each powered by a current transformer installed on one line wire such that the sum of the currents delivered by the rectifiers flows in the resistive element.

4 Claims, 1 Drawing Sheet

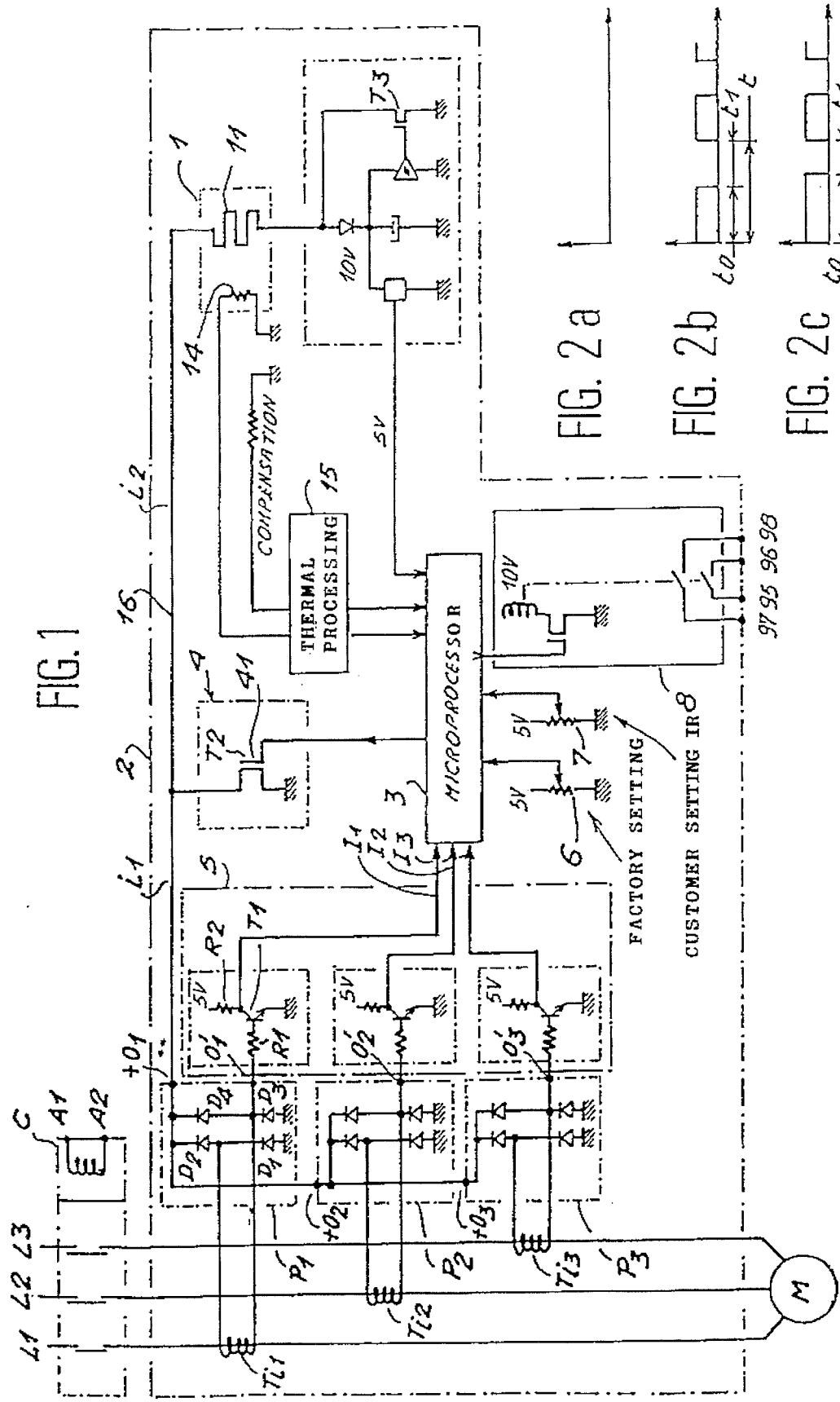

ELECTRONIC THERMAL PROTECTION DEVICE

BACKGROUND OF THE INVENTION

1. Field of the Invention

This invention concerns an electronic thermal protection device designed to interrupt the power supply on a multiphase line including a temperature detector with a resistive element thermally coupled to a temperature sensor, the latter being connected to a digital processing circuit capable of outputting a control command as a function of the overload detected by the temperature sensor.

2. Description of the Prior Art

Thermal relays are used to protect electrical machines, controlling overloads applied on phases or unbalances or missing phases. A typical thermal relay includes a bimetallic strip for each phase, heated by the phase current. When an overload occurs on one phase, the bimetallic strip for the overloaded phase bends and physically activates a trip mechanism that opens the contact that switches the load off power supply. A differential device is used to activate tripping in the case of an unbalanced phase or a missing phase.

These thermal relays are difficult to use for high currents because the heat input into each bimetallic strip, and therefore the trip current, are not closely controlled since parasite heating occurs.

Electronic relays, such as those described in French patent 2.586.489, are also used to protect machines. These relays include a current sensor producing an image of the phase current, for each phase. An electronic processing circuit receives and processes the phase current images in order to output a trip command.

French patent 2.641.410 describes an electronic relay equipped with a temperature detector comprising a resistive heating element for each phase, through which the phase current passes, and which is thermally coupled to a temperature sensor through a thermal coupling body. This thermal detector is a simple way of storing the thermal condition of the load protected by the relay. This relay uses a resistive element for each phase.

One of the main purposes of the invention is to provide an electronic temperature protection device for a multiphase current using a single temperature detector for all phases, equipped with a single resistance. The temperature detector works at a relatively constant power that reduces temperature increases, makes a more economic design and only requires one resistance when hot. The resistive component of the detector may be made by silk screen printing.

SUMMARY OF THE INVENTION

The invention consists in an electronic thermal protection device designed to cut off the power supply on a multiphase line comprising a thermal detector equipped with a resistive element thermally coupled to a temperature sensor that is connected to a digital processing circuit adapted for outputting a control order as a function of the overload detected by the temperature sensor, wherein the resistive element in the thermal detector is connected to the various rectifiers each powered by a current transformer installed on a line wire so that the sum of the currents delivered by the rectifiers flows in the resistive element.

In accordance with one feature of the invention, the summated current injected on the temperature detector resistance is adjusted using an electronic adjustment circuit controlled in pulse width modulation by the digital processing circuit.

In accordance with another feature of the invention, the temperature detector resistive element receives the rectifier output current on one terminal, and its second terminal outputs into a power supply circuit, and the output from this power supply is injected onto the power supply input of the digital microprocessor circuit.

In accordance with another feature of the invention, the digital microprocessor circuit controls a switch device through a control circuit.

BRIEF DESCRIPTION OF THE DRAWINGS

The invention will now be described in more detail with reference to one embodiment of the invention shown by way of example in the appended drawings.

FIG. 1 is a block diagram of the electronic thermal protection relay of the invention;

FIGS. 2a, 2b and 2c show diagrams for the current adjustment circuit applied to the temperature detector.

DETAILED DESCRIPTION OF THE PREFERRED EMBODIMENT

The temperature protection device or the thermal relay according to the invention is designed to interrupt the current on a line $L_1$, $L_2$ or $L_3$ powering a three-phase load, represented here by a three-phase electric motor M, if there is an overload or unbalance between phase currents.

A current transformer type current sensor is placed on each phase line $L_1$, $L_2$ and $L_3$, denoted $Ti_1$, $Ti_2$ and $Ti_3$ respectively. These transformers are sensors that are well known and are conventionally used for current measurements. Secondary outputs from each transformer $Ti_1$, $Ti_2$ and $Ti_3$ are connected to a rectifier $P_1$, $P_2$ and $P_3$ respectively, which comprises diodes $D_1$, $D_2$, $D_3$ and $D_4$ and outputs rectified (dc) current onto two outputs $O_1$, $O'_1$ $O_2$ $O'_2$ and $O_3$ $O'_3$ respectively.

The positive outputs $O_1$, $O_2$, $O_3$ of rectifiers $P_1$, $P_2$, $P_3$ are connected in common to a resistive heating element 11 (resistance), the second terminal of which is input to a power supply circuit 9. Therefore the rectified (dc) current from the rectifier positive outputs $O_1$, $O_2$, $O_3$, is input to the first terminal of resistance 11. The power supply output from power supply circuit 9 is injected onto the power supply input of a digital microprocessor circuit 3.

Resistance 11 forms part of a temperature detector 1, in which it is thermally coupled to a single temperature sensor 14, of a type which is well known. A thermal coupling plate made of a temperature resistant and electrically insulating material separates the temperature sensor 14 and resistance 11.

Resistance 11 is preferably silk screen printed on the thermal coupling plate. Temperature sensor 14 may also be silk screen printed on the face opposite the face on which resistance 11 is printed. As a variant, sensor 14 may be independent of the thermal coupling plate, while being in direct contact with it.

The resistance 11, the thermal coupling plate and the temperature sensor 14 are housed in a box made of an electrically insulating material.

The temperature sensor 14 output signal is directed through a circuit 15 to the digital microprocessor processing circuit 3 that processes received signals and outputs a trip order or command.

Two inputs to the digital processing circuit 3 receive information output by a device adjusted in the factory 6 and a device adjusted by the customer 7 (current $I_R$), respectively.

The thermal relay 2 described above may be associated with a contactor C installed on lines $L_1$, $L_2$, $L_3$ so as to interrupt the motor power supply following an order from the thermal relay. The microprocessor circuit 3 controls an output circuit 8, in which the On/Off outputs marks 95 to 98 can be connected to inputs A1 and A2 of the coil in contactor C.

The current in the common output from the rectifiers is adjusted by an adjustment circuit 4 composed of a transistor T2 controlled in pulse width modulation (PWM) by the digital microprocessor circuit 3. An output from digital circuit 3 is input to one of the connection points for transistor T2, the other connection points being connected to the ground and to link 16 between the rectifier outputs and the temperature detector resistance 11.

Each negative output from rectifiers $P_1$, $P_2$, $P_3$ is applied to inputs $l_1$, $l_2$, $l_3$ of digital microprocessor circuit 3, through an unbalances processing circuit 5.

The operation of the thermal relay will now be explained.

The secondary currents in current transformers $Ti_1$, $Ti_2$, $Ti_3$ are rectified and added to form a current $i_1$ which is input to the resistance 11 of the thermal detector. The current passing through the resistance 11 is therefore proportional to the sum of the currents in the rectified phases.

As a function of the customer adjustment current $i_R$ determined by the adjustment device 7, the digital microprocessor circuit 3 controls the transistor T2 in pulse width modulation (PWM) such that the power dissipated in temperature detector 1 is constant regardless of the value of the customer setting.

In this way, the temperature detector 1 always works with the same power, regardless of the value of the adjustment current $i_R$. Temperature increases are low when iR=iR max. The technology of the thermal detector becomes less expensive, only one hot adjustment is necessary and temperature increases are low.

FIG. 2 is a diagram illustrating the operation of transistor $T_2$. When current $I_R$ is equal to the minimum value, transistor $T_2$ does not conduct (FIG. 2a). When current $I_R$ exceeds the minimum value, transistor $T_2$ becomes conducting (FIGS. 2b, 2c). The ratio between the closing time $t_O$ of transistor $T_2$ and the duration of period t increases with the value of the current $I_R$.

The temperature rise in resistance 11 is measured by the temperature sensor 14 which continuously outputs the image of the temperature rise caused by the images of the phase currents. When the thermal image given by the thermal detector I exceeds a determined threshold, the microprocessor circuit 3 generates a trip order which controls contactor C through the output circuit 8.

When the device detects a phase unbalance or a missing phase through the unbalances processing device 5, the microprocessor in circuit 3 generates a trip order that acts on the coil on contactor C through output circuit 8.

In the even of a power failure, a temperature image of the temperature rise in the motor is retained by means of the thermal detector 1.

Obviously, the invention can be include variants and improvements of detail, possibly using equivalent means.

We claim:

1. An electronic thermal protection device for interrupting the power supply on a multiphase line, comprising:
   a thermal detector including a resistive element;
   a temperature sensor thermally coupled to said resistive element;
   a digital processing circuit connected to said temperature sensor for outputting a control order as a function of an overload detected by the temperature sensor;
   a plurality of rectifiers each powered by a current transformer installed on one line such that a sum of the currents delivered by said rectifiers flows into said resistive element; and
   an electronic regulation circuit for adjusting said sum of the currents, said electronic regulation circuit being controlled in pulse width modulation by said digital processing circuit.

2. Device according to claim 1, wherein said electronic regulation circuit consists of a transistor.

3. Device according to claim 1, wherein said digital processing circuit is a digital microprocessor circuit and drives a switch device through a control circuit.

4. Device according to claim 1, wherein the resistive element of the thermal detector, which receives on a first terminal the output current of said rectifiers, supplies from a second terminal a power supply circuit and a power supply output of said power supply circuit is connected to power supply input of said digital processing circuit.

* * * * *

UNITED STATES PATENT AND TRADEMARK OFFICE
CERTIFICATE OF CORRECTION

PATENT NO. : 5,585,995
DATED : DECEMBER 17, 1996
INVENTOR(S) : BAURAND ET AL

It is certified that error appears in the above-indentified patent and that said Letters Patent is hereby corrected as shown below:

Column 1, line 57, delete "in" and insert --of--.

Column 3, line 26, change "$1_1, 1_2, 1_3$" to --$I_1, I_2, I_3$--.

Column 4, line 15, change "even" to --event--;

line 19, delete "be".

Signed and Sealed this

Third Day of February, 1998

BRUCE LEHMAN

Attest:

Attesting Officer

Commissioner of Patents and Trademarks